(12) United States Patent
Hussien et al.

(10) Patent No.: US 10,946,338 B2
(45) Date of Patent: Mar. 16, 2021

(54) COMPOSITE REVERSE OSMOSIS MEMBRANE, A WATER FILTRATION SYSTEM AND A METHOD OF MANUFACTURING SAME

(71) Applicant: Qatar Foundation, Doha (QA)

(72) Inventors: Muataz Hussien, Doha (QA); Yehia Manawi, Doha (QA); Viktor Kochkodan, Doha (QA)

(73) Assignee: QATAR FOUNDATION, Doha (QA)

( * ) Notice: Subject to any disclaimer, the term of this patent is extended or adjusted under 35 U.S.C. 154(b) by 0 days.

(21) Appl. No.: 16/156,312

(22) Filed: Oct. 10, 2018

(65) Prior Publication Data
US 2019/0105607 A1   Apr. 11, 2019

Related U.S. Application Data

(60) Provisional application No. 62/570,415, filed on Oct. 10, 2017.

(51) Int. Cl.
| | |
|---|---|
| *B01D 61/02* | (2006.01) |
| *B01D 67/00* | (2006.01) |
| *B01D 71/56* | (2006.01) |
| *B01D 71/08* | (2006.01) |
| *C02F 1/44* | (2006.01) |
| *B01D 69/12* | (2006.01) |
| *B01D 61/08* | (2006.01) |
| *B01D 69/02* | (2006.01) |
| *C02F 103/08* | (2006.01) |

(52) U.S. Cl.
CPC ....... *B01D 61/025* (2013.01); *B01D 67/0006* (2013.01); *B01D 69/125* (2013.01); *B01D 71/08* (2013.01); *B01D 71/56* (2013.01); *C02F 1/441* (2013.01); *B01D 61/08* (2013.01); *B01D 69/02* (2013.01); *B01D 2323/40* (2013.01); *B01D 2325/36* (2013.01); *C02F 2103/08* (2013.01)

(58) Field of Classification Search
CPC .............. B01D 61/025; B01D 67/0006; B01D 69/125; B01D 71/08; B01D 71/56; B01D 2323/40; B01D 69/02; B01D 2325/36; B01D 61/08; C02F 2103/08; C02F 1/441
See application file for complete search history.

(56) References Cited

U.S. PATENT DOCUMENTS

| | | | |
|---|---|---|---|
| 6,177,011 B1 | 1/2001 | Hachisuka et al. | |
| 7,022,514 B2* | 4/2006 | Vodyanoy | A01N 1/02 424/725 |
| 2008/0237126 A1 | 10/2008 | Hoek et al. | |
| 2015/0083657 A1* | 3/2015 | Lu | B01D 67/0006 210/489 |

FOREIGN PATENT DOCUMENTS

CN            104209012 A        12/2014

* cited by examiner

*Primary Examiner* — Waqaas Ali
(74) *Attorney, Agent, or Firm* — K&L Gates LLP

(57) ABSTRACT

A reverse osmosis membrane and a method for producing the composite reverse osmosis membrane are provided. The reverse osmosis membrane includes a first layer including a polyamide compound, and a second layer including acacia gum. The method includes steps of providing a trimesoyl chloride solution; adding acacia gum to the trimesoyl to form an organic solution; adding the organic solution to an m-phenylenediamine solution to form a mixture; and heating the mixture and rinsing the mixture.

16 Claims, 17 Drawing Sheets

Figure 6 (a)    Figure 6 (b)
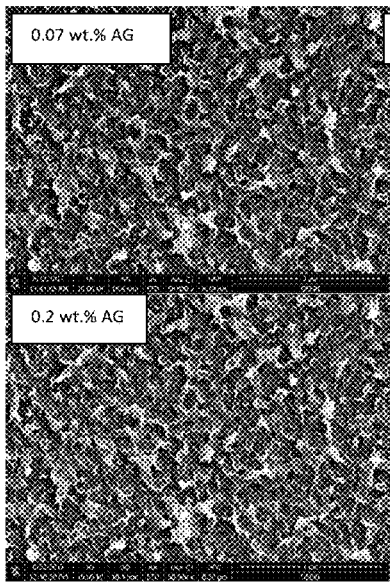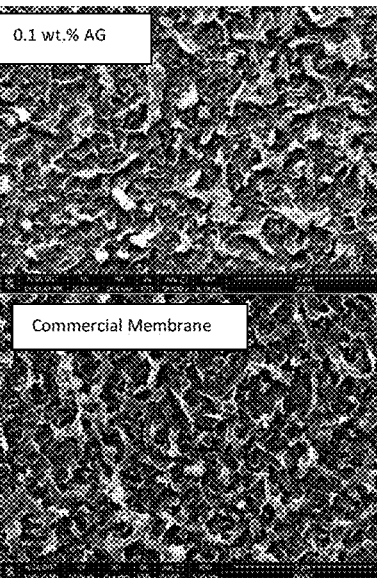
Figure 6 (c)    Figure 6 (d)

COMPOSITE REVERSE OSMOSIS MEMBRANE, A WATER FILTRATION SYSTEM AND A METHOD OF MANUFACTURING SAME

CROSS REFERENCE TO RELATED APPLICATIONS

The present application claims the benefit of U.S. Provisional Application No. 62/570,415, filed on Oct. 10, 2017, the disclosure of which is incorporated into this specification by reference in its entirety.

BACKGROUND

A sharp growth in the world's population coupled with urbanization has resulted in a rapidly increasing demand for fresh water. More than 1.2 billion people in the world lack access to clean and safe drinking water and problems with water are expected to grow worse in the coming decades. Nowadays reverse osmosis is regarded as one of the most attractive methods for seawater desalination. Interfacial polymerization is one of the most important methods for commercial fabrication of thin-film composite reverse osmosis and NF membranes. The first interracially polymerized thin-film composite membranes represented a breakthrough in membrane performance for reverse osmosis applications. The original interfacial polymerization protocol involved soaking a microporous polysulfone support in an aqueous solution of a polymeric amine and then immersing the amine impregnated membrane into a solution of a di-isocyanate in hexane. The membrane was then cross-linked by heat-treatment at 110° C. The resulting thin-film composite polyurea membrane had better salt rejection than that of an integrally-skinned asymmetric cellulose acetate membrane and high water flux.

Most reverse osmosis membranes produced by interfacial polymerization method have a polyamide thin layer on top of a membrane support.

Some monomers have been suggested for preparation of thin-film composite membranes via interfacial polymerization technique. These monomers contain more functional or polar groups, so the prepared membrane has better hydrophilicity, which is advantageous to the improvement of antifouling property of the membranes. Besides the exploration of these monomers for interfacial polymerization, the efforts have been done on the improvement of interfacial polymerization process via adding of active organic modifiers into trimesoyl chloride or m-phenylenediamine solutions. The modifiers can participate in the reaction and are introduced into functional barrier layer, thus improving the surface property and fouling resistance of resultant reverse osmosis membranes. For example, trimesoyl chloride was added with 4,4'-methylene bis(phenyl isocyanate) and PEGs of average molecular weight 200 and 1000 Da to incorporate in situ hydrophilic surface modifying macromolecules. The filtration results showed that the flux decline with model foulants such as sodium humate and silica particles was reduced significantly after incorporating organic modifiers into the thin-film composite membranes. A similar approach was also conducted by adding polyvinyl alcohol (PVA) into piperazine solution during interfacial polymerization to prepare low fouling NF membrane. It was also shown that the addition of an acid-acceptor, e.g. salt of triethylamine, with sulfonic acid in aqueous solution could speed-up interfacial polymerization reaction by removing hydrogen halide by-products formed during amide bond formation.

SUMMARY

The present disclosure generally relates to a composite reverse osmosis membrane and a method for producing the composite reverse osmosis membrane.

According to an embodiment of the present disclosure, a composite reverse osmosis membrane is provided. The reverse osmosis membrane includes a first layer including a polyamide compound, and a second layer including acacia gum.

According to an embodiment of the present disclosure, a water filtration system is provided. The water filtration system includes a water filter including a composite reverse osmosis membrane. The composite includes a first layer including a polyamide compound, and a second layer including acacia gum.

According to another embodiment of the present disclosure, a method for producing a composite reverse osmosis membrane is provided. The method includes the steps of: providing a trimesoyl chloride solution; adding acacia gum to the trimesoyl chloride solution to form an organic solution; adding the organic solution to m-phenylenediamine solution to form a mixture; heating the mixture; and rinsing the mixture.

According to at least one embodiment, the present technology enables improvement hydrophilic and antifouling properties of the composite reverse osmosis membrane by having acacia gum as an additive during membrane casting. Additional features and advantages are described herein, and will be apparent from the following Detailed Description and the figures.

BRIEF DESCRIPTION OF THE FIGURES

FIGS. 6 (a)-6(d) depict SEM top views of PA membranes with 0.07, 0.1 and 0.2 wt. % AG in dope solution in addition to the commercial AD Osmonic membrane according to an embodiment of the present disclosure.

The reader will appreciate the foregoing details, as well as others, upon considering the following detailed description of certain non-limiting embodiments of air suspension devices and air suspension systems according to the present disclosure. The reader may also comprehend certain of such additional details upon using the air suspension devices and air suspension systems described herein.

DETAILED DESCRIPTION

The present disclosure provides a composite reverse osmosis membrane and a method for producing the composite reverse osmosis membrane.

Acacia gum is a natural gum. It can be extracted from the dried gummy exudation which can be found in some acacia trees species. Acacia gum shows great amphiphilic nature. Acacia gum includes high molecular weight polysaccharides (~97%) and a proteinous fraction (~3%). Acacia gum is widely used in food industry as a surfactant and emulsifier. Moreover, acacia gum is extensively used in cosmetics, pharmaceutics, and dentistry to combat periodontic bacteria and deposition of plaque due to its anti-bacterial properties. It has surprisingly been found that these amphiphilic and antibacterial properties of acacia gum as an additive during membrane casting be can be used for the improvement of hydrophilic and the antifouling properties of the composite reverse composite membranes. The present disclosure relates to the use of acacia gum as an additive during interfacial polymerization preparation of composite polyamide reverse osmosis membranes.

Figure 1:
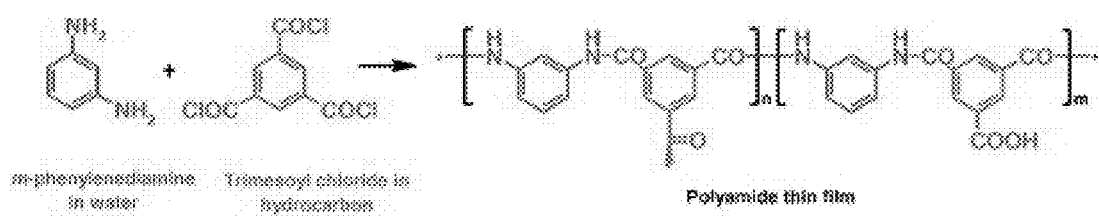
FIG. 1 depicts a polyamide membrane derived from m-phenylenediamine and trimesoyl chloride via interfacial polymerization according to an embodiment of the present disclosure.

According to an embodiment of the present disclosure, the thin-film composite reverse osmosis membrane may be fabricated through the use of an aqueous solution. FIG. 1 shows a synthesis scheme of a polyamide membrane derived from m-phenylenediamine and trimesoyl chloride. For example, an aqueous m-phenylenediamine solution was prepared by dissolving 2 wt. % of m-phenylenediamine in deionized water. An organic trimesoyl chloride solution was prepared by dissolving 0.1 wt. % of trimesoyl chloride in n-hexane solvent. Acacia gum was added to the organic solvent and stirred overnight. Several concentrations of acacia gum such as 0.01 wt. %, 0.03 wt. %, 0.05 wt. %, 0.07 wt. %, 0.1 wt. % and 0.2 wt. % were respectively added to the trimesoyl chloride solution to form the trimesoyl chloride solution having different concentrations of acacia gum.

More specifically, the fabrication of the thin-film composite reverse osmosis membrane was conducted as follows:
(1) Soak a commercially available substrate in water for 48 hours,
(2) wipe off the excess water from the surface of the substrate using rubber roller,
(3) add 40 ml of m-phenylenediamine solution on top of the substrate and wait for 2 minutes,
(4) decant the m-phenylenediamine solution and wipe off the excess m-phenylenediamine solution using rubber roller,
(5) add 30 gram of trimesoyl chloride solution having different concentrations of acacia gum, and wait for 1 minute,
(6) leave the membrane to dry for one minute,
(7) keep the membrane inside oven at 60° C. or in a proper temperature range for 5 minutes,
(8) Take the membrane out and soak it in deionized water or any other suitable solvent for overnight before testing.

Figure 2:
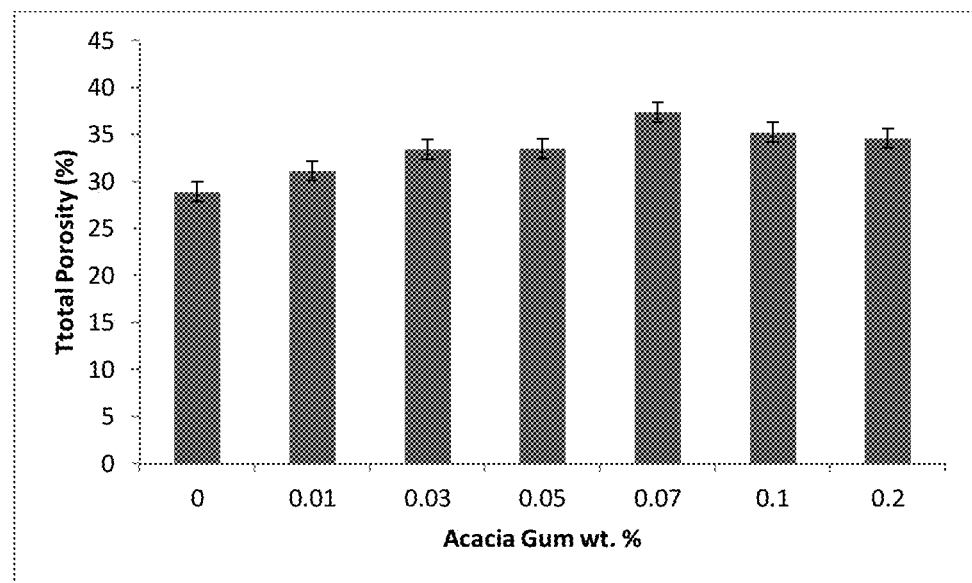
FIG. 2 depicts a graphical representation of the total porosity (%) of the fabricated composite membranes at different acacia gum loading according to an embodiment of the present disclosure.

The fabricated thin-film composite reverse osmosis membranes were characterized and tested using contact angle measurement, and sterlitech dead end filtration. The total porosity was also measured using gravimetric method. FIG. 2 shows the total porosity (%) of the fabricated thin-film composite reverse osmosis membranes at different acacia gum loading. As shown in FIG. 2, the thin-film composite reverse osmosis membrane having a 0.07% concentration of acacia gum shows the highest value of the total porosity, and the highest value of the total porosity is more than 35%. On the other hand, the thin-film reverse osmosis membrane without adding of acacia gum shows the lowest value of the total porosity.

Figure 3:
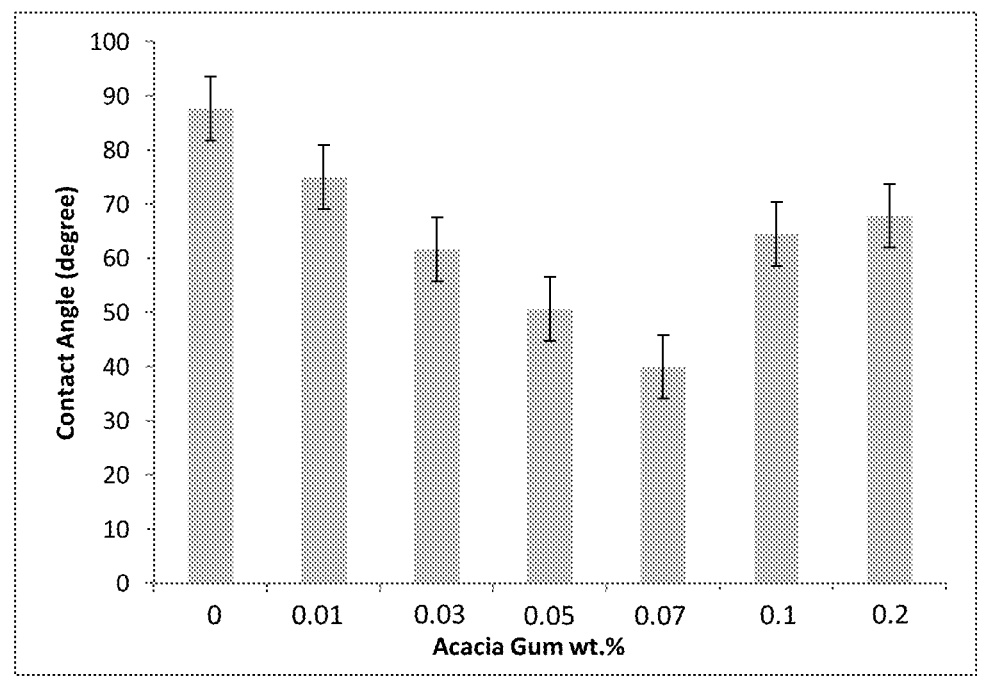
FIG. 3 depicts a graphical representation of contact angle of the fabricated composite membranes at different acacia gum loading according to an embodiment of the present disclosure.

FIG. 3 shows the contact angle values of the water droplet with membrane's surface at different acacia gum loading in the top layer. As shown in FIG. 3, the thin-film composite reverse osmosis membrane having a 0.07% concentration of acacia gum shows the lowest value of the contact angle, and the contact angle is lower than 40 degree. On the other hand, the thin-film reverse osmosis membrane without adding of acacia gum shows the highest value of the contact angle.

Figure 4:
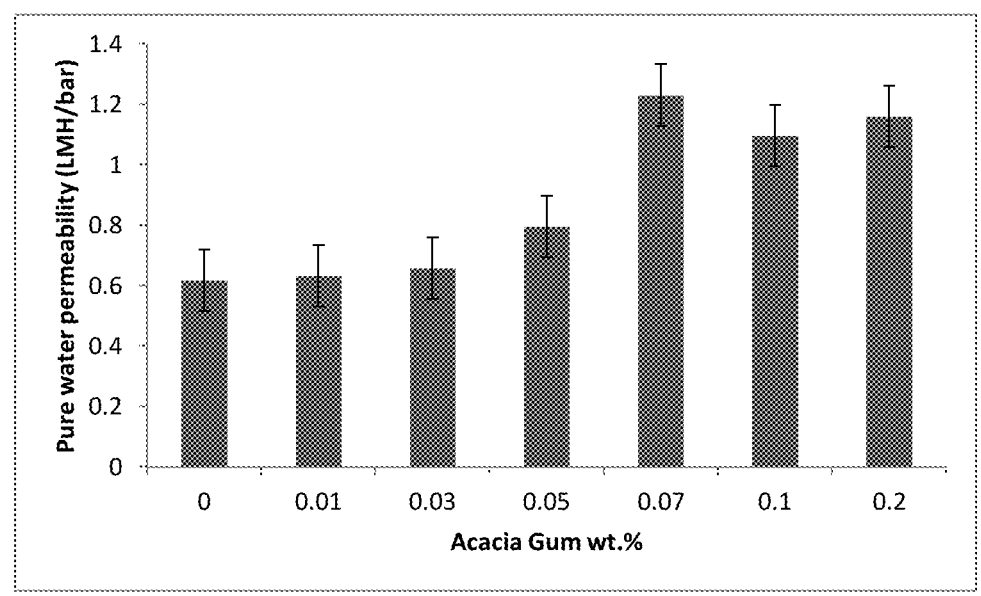
FIG. 4 depicts a graphical representation of permeability of the fabricated composite membranes at different acacia gum loading according to an embodiment of the present disclosure.

FIG. 4 shows the pure water permeability (LMH/Bar) of the fabricated thin-film composite reverse osmosis membranes at different acacia gum loading. As shown in FIG. 4, the thin-film composite reverse osmosis membrane having a 0.07% concentration of acacia gum shows the highest value of the pure water permeability (LMH/Bar), and the highest value is more than 1.2 LMH/bar. On the other hand, the thin-film reverse osmosis membrane without adding of acacia gum shows the lowest value of the pure water permeability (LMH/Bar).

Figure 5:
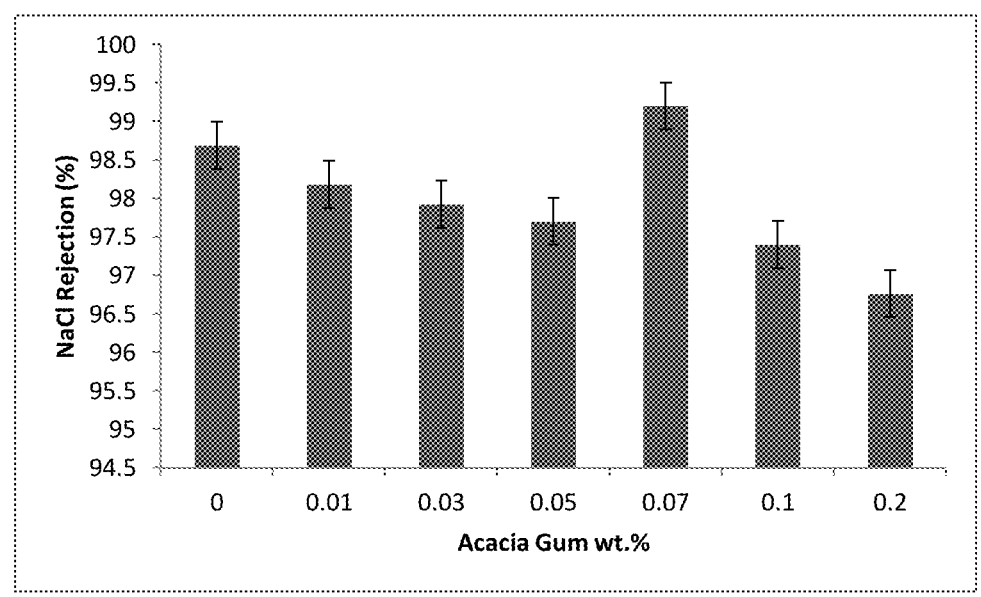
FIG. 5 depicts a graphical representation of salt rejection of the fabricated composite membranes at different acacia gum loading according to an embodiment of the present disclosure.

FIG. 5 shows salt rejection of 2000 ppm sodium chloride (NaCl) solution of the fabricated thin-film composite reverse osmosis membranes at different acacia gum loading. As shown in FIG. 5, the thin-film composite reverse osmosis membrane having a 0.07% concentration of acacia gum shows the highest value of the salt rejection, and the highest value is more than 99%. The salt rejection of the thin-film reverse osmosis membrane having other concentrations of acacia gum still remained above 96.7%.

As seen in the results, the addition of acacia gum to polyamide reverse osmosis membranes was found to increase the total porosity (by 29%) and hydrophilicity (reduce the contact angle by 54%) and hence increase the membrane permeability by one fold. Moreover, the addition of acacia gum was found to increase the pore size, and the salt rejection was still remained above 96.7%.

According to an embodiment of the present disclosure, a thin film composite (TFC) polyamide (PA) membranes blended with 0.01-0.2 wt. % of Acacia gum (AG) have been prepared using interfacial polymerization technique.

Acacia gum is a natural gum which is collected as exudation from the stem and branches of Vachellia (Acacia) seyal and Acacia Senegal. AG is complicated blend of polysaccharides and glycoproteins. The main amino acids present in AG are: histidine, glycine, alanine, arginine and glutamic acid whereas the main monosaccharides are: galactose, arobinopyranose, rhamnose and glucuronic acid. AG is widely used in industry as an edible surfactant, emulsifier and stabilizer (E414) in addition to numerous other applications in various fields. The reason behind the wide use of AG compared to other natural gums is due to its good emulsifying properties, high solubility, low viscosity and non-toxicity. The amphiphilic nature of the AG is due to the simultaneous existence of the hydrophilic polysaccharides fragments and the hydrophobic protein chains in AG macromolecules. This amphiphilic behavior is believed to be responsible for emulsifying properties of AG when hydrophobic residues adsorb to the oil droplet surface whereas the hydrophilic ramification limits the droplet aggregation and coalescence via the steric and/or repulsive electrostatic forces. The specification discloses the effect of the addition of AG on the hydrophilicity, surface roughness, flux, salt rejection, chlorine and fouling resistance of the prepared TFC PA/AG membranes. It was shown that amphiphilic nature of AG can be utilized to enhance the performance of PA TFC membranes in terms of flux and antifouling properties.

Materials 1,3 phenylenediamine (MPD) and sodium hypochlorite were purchased from Merck (Germany). 1,3,5-Benzentricarboxylic acid chloride (TMC) was acquired from Acros (Germany). N-hexane and sodium alginate were purchased from Sigma Aldrich (USA). Polysulfone ultrafiltration membrane (PS-20 UF) from SEPRO Membranes (USA) with molecular weight cut-off of 20 kDa was used as a commercial substrate for the preparation of TFC membranes. For comparison purposes, two commercial RO PA TFC membranes from GE Osmonics and Dow SW30HR were used in this work.

TFC Membrane Fabrication

Several loadings of AG, 0.01, 0.03, 0.05, 0.07, 0.10 and 0.20 wt. %, were added to the TMC/n-hexane solution and stirred for overnight. The thin PA layer was introduced on top of the commercial substrate via IP technique. The fabrication of the membrane was conducted as follows: First, the commercial substrate was soaked in water for 48 h to remove air bubbles. Then, the excess water from the surface of the substrate was wiped off using a rubber roller. 40 ml of MPD solution (2 wt. % of MPD in deionized water) was poured on top of the substrate and the solution was kept for 2 min. The MPD solution was then decanted and wiped off using rubber roller. After that, 0.1 wt. % solution of TMC in n-hexane was poured on the substrate surface and kept for 1 min to allow the polymerization process to take place. The TMC solution was then decanted and wiped off using a rubber roller. The membrane was left to dry for 1 min before inserting it inside an oven at 60° C. for 5 min. Finally, the membrane was taken out and soaked in deionized water for overnight before testing.

Membrane Characterization and Testing

Surface Morphology and Porous Structure

In order to analyze the morphology of the membranes, the top and cross-section views of the fabricated membranes were observed using Field Emission Scanning Electron Microscopy (FESEM) (Gemini model SUPRA 55VP-ZEISS). Liquid nitrogen was used to break the membrane samples and platinum was used to coat the top of membrane's surfaces prior to SEM scanning.

Membrane Surface Charge and Hydrophilicity

SurPass 3 electrokinetic analyser (Anton Paar KG, Austria) was utilized to figure out the zeta potentials of the membranes. Helmholz-Smoluchowsky equation was implemented to estimate the zeta potential value on the membrane's surface from the slope of the streaming potential versus operating pressure curve:

$$\zeta = \frac{\Delta E \mu k}{\Delta P \varphi_o \varphi_r} \quad (1)$$

Where, $\Delta P$ is the pressure drop across the membrane, $\varphi_o$ is the vacuum permittivity, $\mu$ is the solution viscosity, $\varphi_r$ is the dielectric constant of water (at 25° C.), k is the conductivity of the electrolyte and $\Delta E$ is the streaming potential. In this work, the zeta potential of the membrane surfaces was measured at different pH values (acidic, neutral and basic conditions) by changing the pH of the electrolyte solution using 0.1 M HCl and 0.1 M NaOH solutions. The hydrophilicity of the membranes was estimated by measuring the contact angle of the water droplet of 2.0 μl with the membrane surfaces using Ramé-hart standard contact angle goniometer (USA).

Fourier Transform Infrared (FTIR)

FTIR spectra of the membrane samples and the permeate collected were recorded using Nicolet 6700 Thermo Scientific-FITR spectrometer (USA).

Membrane Filtration Tests

The filtration tests were carried out using 300 ml Sterlitch (USA) dead end filtration cell (HP4750X), which has a membrane cross-section area of $14.6 \times 10^{-4}$ m$^2$. The liquid in the cell was pressurized using nitrogen gas and permeate flux was calculated from equation (2):

$$J = \frac{V}{A \cdot t} \quad (2)$$

where V is the permeate volume (L), A is the membrane cross-sectional area (m²), t is the permeation time (h).

The salt rejection tests were conducted with 2000 ppm NaCl solutions at pH 6-7 and at operating pressure of 15 bars. Additionally the filtration tests with real (untreated) seawater at pH 8.36 and at operating pressure of 54 bars were carried out.

Equation (3) was used to figure out the salt rejection (in %):

$$R(\%) = \left(1 - \frac{C_p}{C_f}\right) \times 100 \quad (3)$$

Where $C_p$ and $C_f$ (in ppm) stand for the salt ions concentration in the permeate and feed solutions, respectively. NaCl concentration was estimated by measuring the electrical conductivity of the feed and permeate solutions using Thermo Scientific Orion Conductivity Benchtop Meter (USA) after appropriate calibration. Ions concentrations in the probes was evaluated by Add about IC The antifouling performance of the prepared membranes was studied by evaluating the normalized flux of the membranes after the filtration of 100 ppm sodium alginate solution at operating pressure of 15 bars. In this test, the pure water flux of the membranes ($J_i$) was first figured out for 15 min. After that, 100 ppm sodium alginate solution was filtered through the membranes for 2 h. In the end, the membrane was rinsed with deionized water (DW) and pure water flux ($J_f$) for 15 min was measured again. The normalized flux ($J_n$) was then calculated using Equation (4):

$$J_n = \frac{J_f}{J_i} \quad (4)$$

Surface Morphology and Roughness

The surface morphology of the membranes surfaces were analyzed using KLA Tencor P-17 Stylus Profiler (USA). This profiler has a Stylus probe diameter of 2 μm, 200 mm scan length in X-Y and Z-resolution of 10 Angstrom.

Membrane Chlorine Stability Tests

In order to account for the chlorine resistance test of the prepared membranes, sodium hypochlorite solution (1000 ppm) was used. In this test, the salt rejection and water permeability were figured out for the PA/AG membranes and the AD commercial membrane before the immersion in NaCl solution after that, the membranes were washed and immersed in the sodium hypochlorite solution for 24 h. The membranes were taken out of NaCl solution, washed sufficiently with DW water before testing their permeability and salt rejection using the same procedure described above. The change in the permeability and salt rejection was then figured out and analyzed.

Seawater Sampling

Seawater samples were collected from the Arabian Gulf at about 200 meters away from the coast line in order to reduce the influence of anthropogenic contaminants. The physico-chemical parameters of the collected seawater samples are presented in Table 1. The seawater was collected using amber glass and polyethylene containers. In order to analyze the inorganic content, seawater sample was acidified with 2 wt. % HNO3. Inductively Coupled Atomic Emission Spectrometer (ICP-AES) was used for analysis of trace metals in the samples.

TABLE 1

The physico-chemical parameters of the seawater sample collected from Al-Ghariyah beach

| Element | Feed seawater |
| --- | --- |
| X-coordinates | 214548.34 |
| Y-coordinates | 482954.73 |
| Latitude | 26.10147 |
| Longitude | 51.362099 |
| Temperature (° C.) | 19 |
| pH | 8.36 |
| Turbidity (NTU) | 0.29 |
| Electrical Conductivity $\left(\frac{mS}{cm}\right)$ | 63.4 |
| Total Organic Carbon (ppm) | 0.52 |

Membrane Morphology and Hydrophilicity

Figure 7:
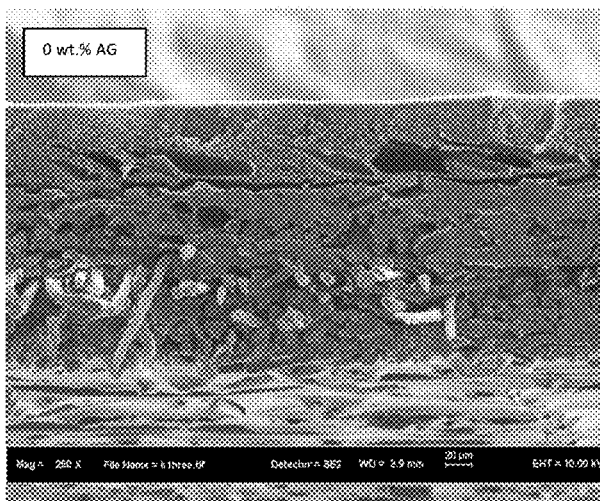
FIGS. 7(a)-7(b) depict cross section views of plain PA membrane and PA/0.1 wt. % AG membrane according to an embodiment of the present disclosure.
Figure 7:
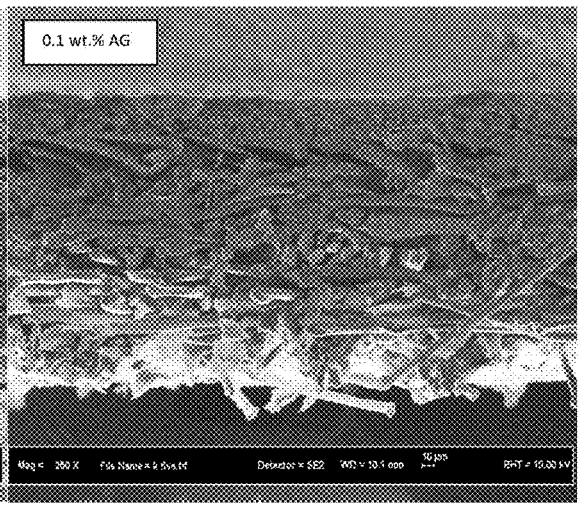

The top surface and cross section of the fabricated membranes were inspected using FE-SEM. FIG. 6 depicts top views of, PA/AG-containing membranes with different AG loading in addition to the commercial PA RO membrane. On the other hand, FIG. 7 shows the cross-section of the PA membrane without AG and PA/0.1 wt. % AG membranes. As seen in FIG. 6, the membrane's top surfaces were uniform and there were no defects in their morphology. The surface topography of the fabricated membranes was similar to that of the commercial AD Osmonic membrane. Furthermore, the cross-section SEM images show practically no difference between the fabricated bare and AG-containing membranes in FIG. 7.

Figure 8:
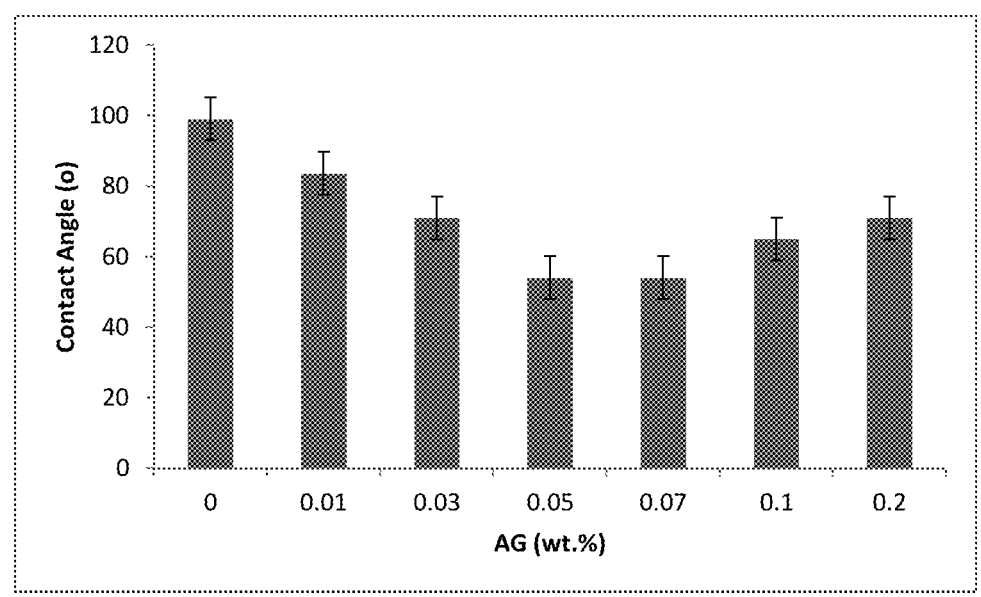
FIG. 8 depicts a graphical representation of a contact angle of the prepared PA/AG membranes at different AG (wt. %) loadings in dope solutions according to an embodiment of the present disclosure.

As seen in FIG. 8, adding AG to PA membranes increase the membrane hydrophilicity by reducing the contact angle by up to 45% (at 0.07 wt. % AG) when compared to bare PA membrane. This hydrophilization effect is believed due to amphiphilic nature of the AG macromolecules, which include both hydrophilic polysaccharides fragments and the hydrophobic protein chains. When introducing AG in IP process, obviously the hydrophobic fractions of the AG macromolecules bind with the hydrophobic PA backbone, while leaving the hydrophilic AG residues (carbohydrates) to hydrophilize the membrane surface.

The drop in water contact angle (and hence increase in the hydrophilicity) has been found to reduce the fouling by the formation of hydrogen bonds between the water molecules and membrane surface minimizing the interaction between the hydrophobic foulants and the membrane surface. Some increase in the PA/AG membrane hydrophobicity at AG loading beyond 0.07 wt. % can be attributed to the possible aggregation of AG molecules in TMC solution, which tend to reduce the hydropilization effect at high AG loading.

In this embodiment, by comparing the increase in the hydrophilicity by the addition of AG to PA, TFC membranes have been found to be more efficient.

DSC Thermograms

Figure 9:
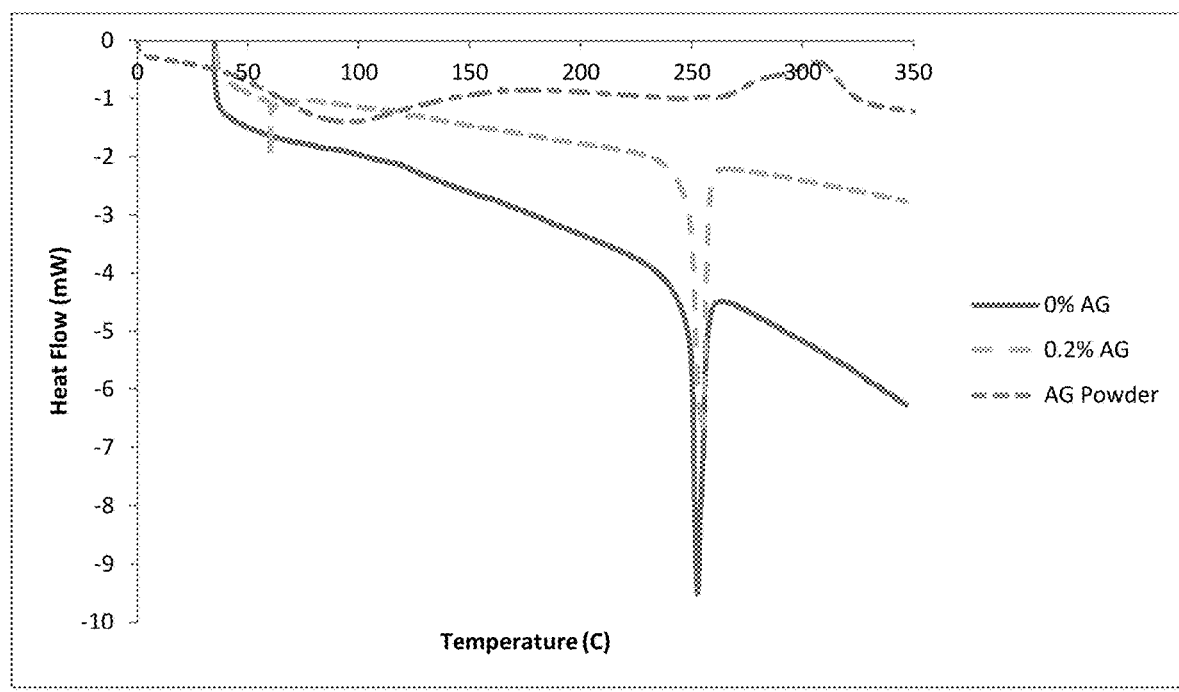
FIG. 9 depicts a thermogram of plain PA membrane (0% AG), PA/0.2 wt. % AG membrane and AG powder according to an embodiment of the present disclosure.

The DSC of pure AG in addition to that of PA/AG membranes is shown in FIG. 9. In AG thermogram, the endothermic peak shown at 90° C. signifies the loss of water absorbed by AG in the form of moisture whereas the exothermic peaks shown at 300° C. indicate the decomposition of AG. These peaks were found to agree with the DSC study conducted by other researchers who analyzed four AG samples from different Acacia species. Their temperature ranges were found to lie between 100-150° C. for the endothermic peaks and 300-315° C. for the exothermic peaks. FIG. 9 also depicts the DSC of PA/AG membranes containing varying loadings of AG. As shown, the presence of the endothermic peaks is clearly shown at around 250° C. These endothermic peaks represent the glass transition temperatures (Tg) of the PA/AG membranes and it is seen that AG addition has no effect on Tg of TFC PA/AG membranes. Moreover, the presence of the small endothermic peak at about 55° C. corresponds to the loss of water which exists as a result of the presence of AG inside the membrane.

Membrane Surface Charge

The effect of AG on the membranes surface charge was studied by measuring the zeta potential of the membrane samples at different pH of the feed solution. As seen in Table 2, the zeta potential of PA/AG membranes become negative with the increase in the pH values of the solution, obviously due to deprotonation of amino groups and dissociation of carboxylic groups in incorporated AG macromolecules. At pH values higher than 1.9, the macromolecules of AG behave as a weak polyelectrolyte carrying a negative surface charge. This behavior may occur due to the dissociation of carboxyl groups of AG.

The increase in the negative zeta potential values of PA membranes along with the increase in the pH may occur due to the deprotonation of the functional groups on the membrane surface.

As seen in Table 2, at acidic conditions the membranes demonstrated positive zeta potential values. This might be explained by the protonation of the functional R—C=O—NH—R groups in the PA membrane as well as amino-groups of AG at these conditions. Interestingly, the AG-containing membrane showed relatively lower positive zeta potential values when compared with pure PA membrane at pH 3.2. The reason behind this decrease is not clear yet as the presence of amino-groups in AG macromolecules, which can be protonated at these conditions, is expected to result in higher positive zeta potential of PA/AG membranes.

TABLE 2

Zeta potential of the prepared PA/AG membranes (pure PA and blended with 0.2 wt. % AG in the TMC/n-hexane solution) at different pH values

| | Zeta potential (mV) | |
|---|---|---|
| pH | 0 wt. % AG | 0.2 wt. % AG |
| 3.2 | 13.6 | 9.6 |
| 3.7 | 4.0 | 2.6 |
| 5 | −28.6 | −24.6 |
| 6 | −37.4 | −41.5 |
| 7 | −43.3 | −50.5 |
| 8 | −45.5 | −51.3 |
| 8.5 | −45.4 | −50.1 |

Surface Roughness

Figure 10:
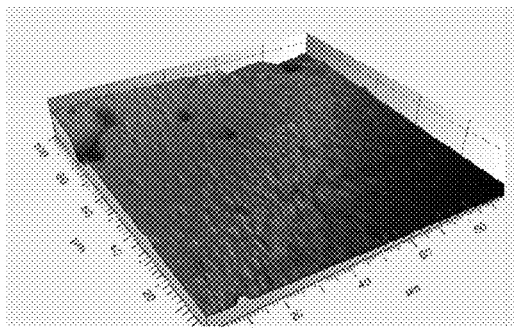
FIGS. 10(a)-10(b) illustrate 3D images depicting the surface of AD commercial membrane (Osmonics) and PA/0.1 wt. % AG membrane from the surface profiler according to an embodiment of the present disclosure. (Scanned area 100×100 μm)
Figure 10:
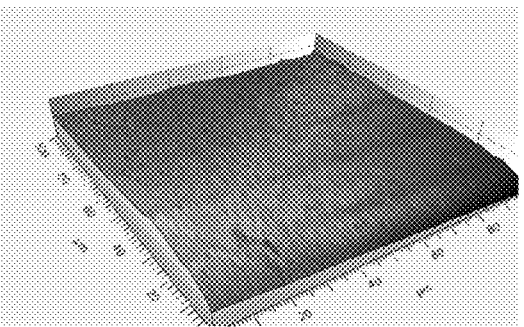
Figure 11:
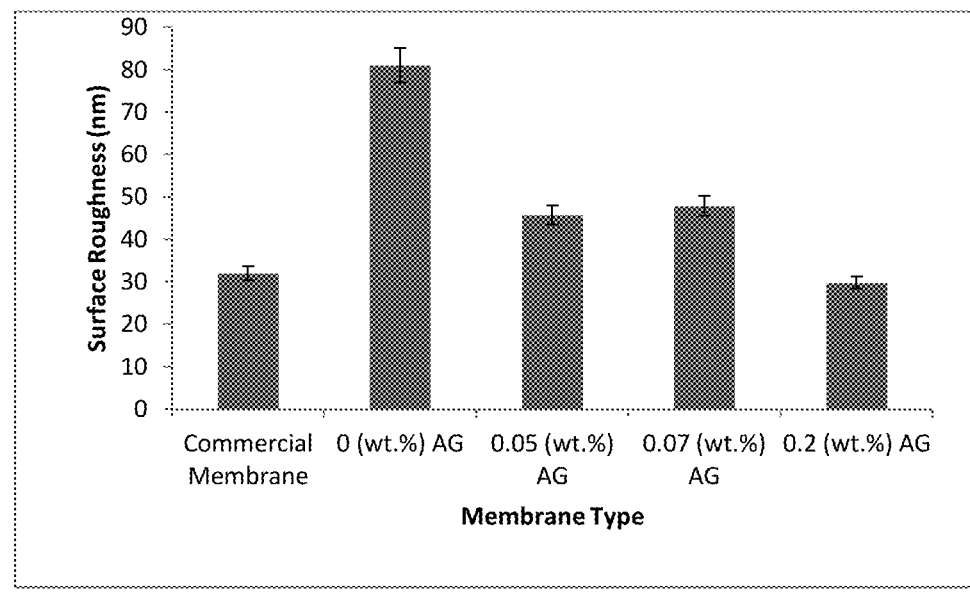
FIG. 11 depicts a graphical representation of average surface roughness of AD commercial membrane and PA/AG membranes at different AG loading in the dope solution in addition to the commercial AD Osmonic membrane according to an embodiment of the present disclosure.

The surface topography of the prepared PA/AG membranes was studied by using the surface profiler. FIG. 10 shows 3D images depicting the top surface of AD commercial membrane (GE Osmonics) and 0.1 wt. % AG membrane. In general, PA/AG-containing membranes showed relatively smoother surfaces (less average surface roughness) when compared with the bare PA membrane as shown in FIG. 11. It is due to the distribution of AG molecules to smoothen the membrane surface and reduce the ridge-valle structure encountered in the interracially polymarized aromatic PA TFC membranes. Moreover, PA/AG membranes with 0.1 and 0.2 wt. % of AG exhibited lower surface roughness (17.1 and 29.8, nm, respectively) compared to the commercial AD membrane, which had an average surface roughness of about 32 nm. The values of the surface roughness for PA/AG membranes were lower than that of TFN membranes including some other nanomaterials.

The reducing of surface roughness of PA/AG membranes might be attributed to the increase in the miscibility between the organic and aqueous phases in IP process, when hydrophilic AG is added, that result in smoothening of the ridge-valle structure of the surface of the prepared PA/AG membranes.

Filtration Tests

Figure 12:
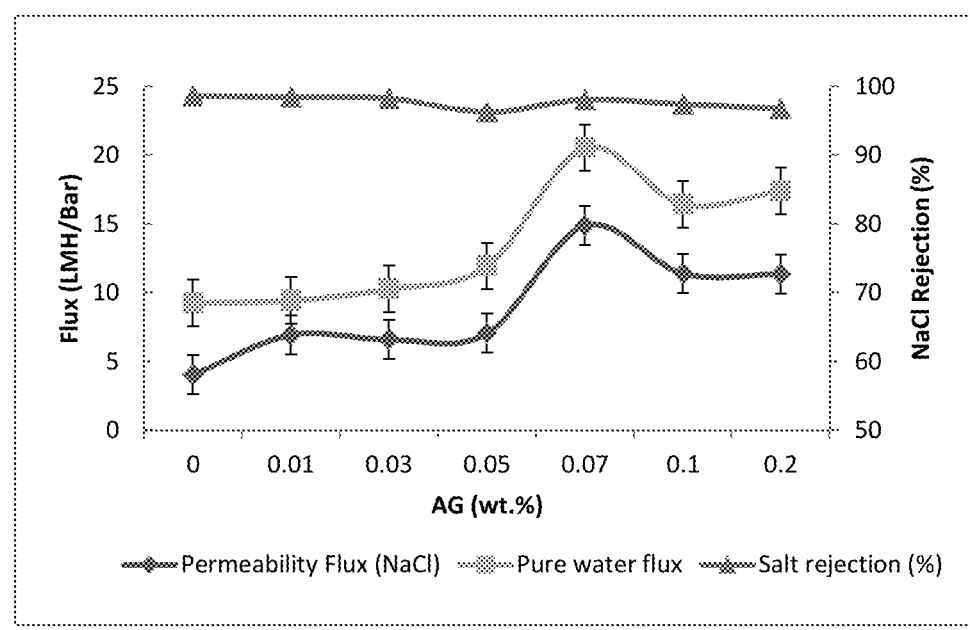
FIG. 12 depicts a graphical representation of fluxes and salt rejection of PA/AG containing membranes at different AG (wt. %) loadings in dope solutions according to an embodiment of the present disclosure. (Feed solution: 2000 ppm NaCl, pH 7. Operating pressure: 15 bars)

The water fluxes and NaCl rejection values with PA/AG membranes at different AG loadings are depicted in FIG. 12. As shown in FIG. 12, the addition of AG to TFC membranes has the effect of increasing the pure water flux and flux during filtration of NaCl solution by 1.2 and 2.6 folds, respectively at 0.07 wt. % AG. Surprisingly, the increase in flux of the TFC membrane did not compromise the salt rejection significantly. The effect of AG loading to PA membrane was found to increase the flux initially and then decrease (beyond 0.07 wt. % AG loading in dope solution). The increase in the membrane's flux can be attributed to the improvement in the PA/AG membrane hydrophilicity. Another possible reason to this behavior can be attributed to the enhancement in the miscibility between the organic and aqueous phases when hydrophilic AG is added; that results in formation of a less cross-linked PA layer.

On the other hand, the decrease in the membrane flux at AG loading above 0.07 wt. % is thought to occur due to the decrease of membrane hydrophilicity at high AG loading due to possible AG aggregation. It should be understood that, the use of AG as an additive resulted in a significant increase in PA/AG membrane flux while keeping NaCl rejection above 96%. This increase in flux has been found to be comparable to that observed when TFN membranes were incorporated with zeolite, $TiO_2$, $SiO_2$, aluminosilicate nanoparticles, and CNTs.

Fouling Tests

Figure 13:
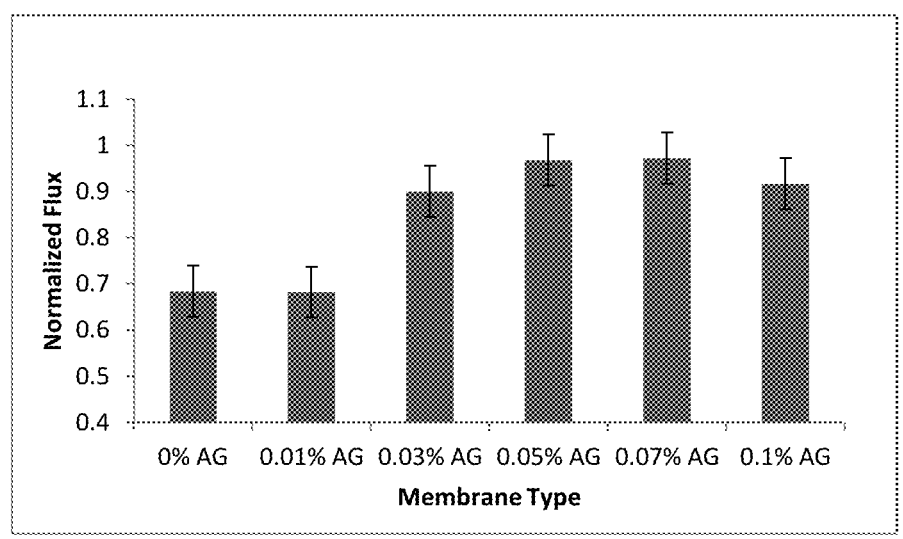
FIG. 13 depicts a graphical representation of normalized flux of PA/AG membranes (at different AG loadings in dope) after filtration of 100 ppm sodium alginate solution at operating pressure of 15 bars for 2 h, pH: 6.95, according to an embodiment of the present disclosure.

The antifouling performance of the prepared PA/AG membranes was evaluated by calculating the normalized flux of the membrane samples after filtration of 100 ppm sodium alginate solution as described in methodology section. As seen in FIG. 13, the addition of AG to PA membranes was found to increase their normalized flux and antifouling properties (by 44%) when compared with the bare PA membrane. This can be attributed due to the increase in the hydrophilicity, surface charge and drop in the surface roughness of PA/AG membranes, which manifested itself in the reduction of the membrane fouling. The surface charge, roughness and hydrophilicity of the membranes influence the membrane flux, rejection, and fouling resistance.

Stability of PA/AG Membranes

FTIR of the Permeate Samples

Figure 14:
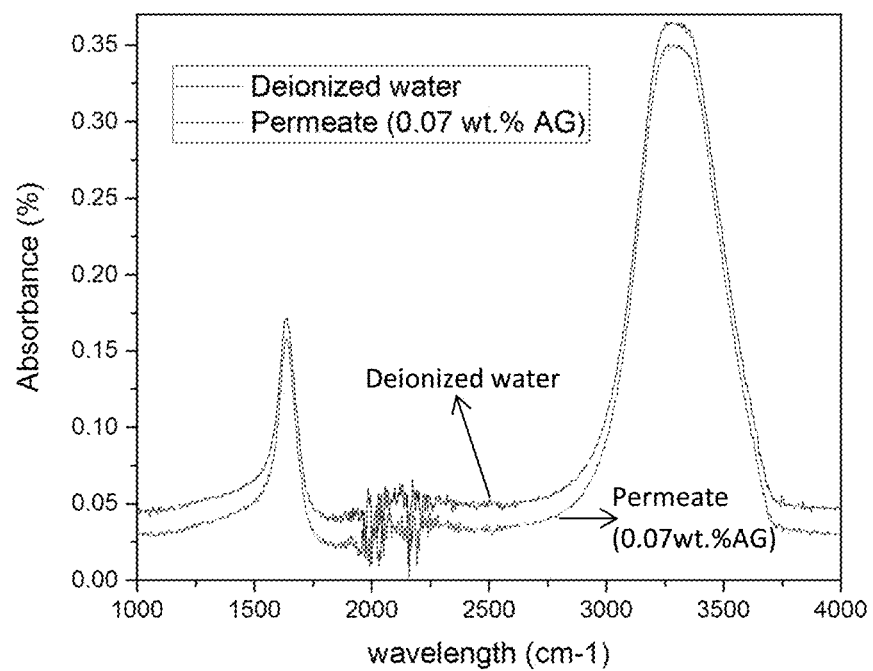
FIG. 14 depicts a graph of FTIR spectra of the permeate with PA/0.07 wt. % AG membrane in comparison with the spectra of DI water according to an embodiment of the present disclosure.

The stability of incorporation of AG in PA/AG membranes was tested by analyzing the FTIR spectra of the permeate samples collected during filtration of DI water. FIG. 14 shows a FTIR spectra of the permeate with PA/0.07 wt. % AG membrane in comparison with the spectra of the DI water. As depicted, the spectra of permeate with PA/AG membrane was identical to that of the DI water. This indicates that there is no leaching of AG from PA/AG membrane.

Chlorine Resistance

Figure 15:
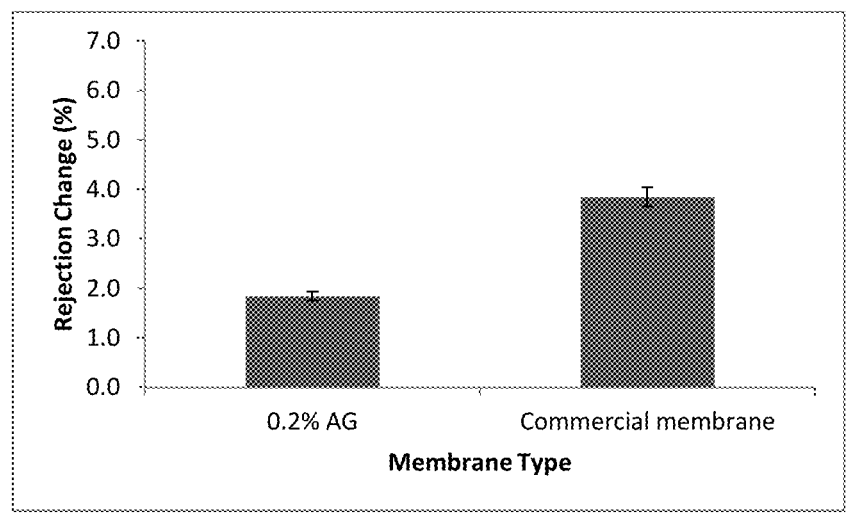
FIG. 15 depicts a graphical representation of change in the salt rejection of the AD commercial membrane and PA/0.2 wt. % AG membrane after immersion in 1000 ppm of NaOCl solution for 24 h according to an embodiment of the present disclosure.

The chlorine resistance test was conducted by the immersion of the prepared PA/AG membranes in 1000 ppm NaOCl solution for 24 h. As seen in FIG. 15, rejection capability of PA/0.2 wt. % AG membrane was less affected by the hypochlorite when compared with AD commercial membrane. The higher resistance of PA/AG membrane to hypochlorite can be attributed to the shielding effect of the AG macromolecules that reduce amide bond cleavage of PA polymer network.

Sodium hypochlorite dissociates in aqueous solutions to form sodium cation and hypochlorite anion, which is a strong oxidizing agent:

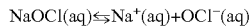

$$NaOCl(aq) \rightleftharpoons Na^+(aq) + OCl^-(aq)$$

The number of carboxylic groups on the PA surface, which appear to form by hydrolysis of the amide bonds (C(O)—N), increased after contact of PA membrane with hypochlorite solution. Since, AG includes both polysaccharides residues and the protein chains with numerous amide bonds, some hypochlorite ions will be consumed for hydrolysis of amide linkages in AG macromolecules and this will reduce the degradation of PA backbone of PA/AG membrane.

It is also possible that introducing of high AG loading (0.2 wt. %) to TMC solution alters the thermodynamic balance in the organic phase and this might results in formation of a more cross-linked top PA layer with better chemical stability. The improved chlorine resistance of PA/AG membranes might extend the membrane lifetime as feed water chlorination is often used to reduce membrane bio-fouling.

Membrane Performance with Seawater

Table 3 lists the composition of the feed seawater, brine and permeate from TFC PA/2 wt. % AG membrane. As seen in the table 3, the permeate from the PA/AG membrane showed substantially lower Total Dissolved Solids (TDS), salt ions and metals content when compared with the feed seawater.

TABLE 3

The characterization results of the seawater, brine and permeate from the TFC PA/2 wt. % AG membrane

| Composition | Feed seawater | Brine | Permeate |
|---|---|---|---|
| Total Dissolved Solids (ppm) | 45,000 | 70,000 | 1400 |
| Chlorides (ppm) | 27877 | 36273 | 840 |
| Sulphates (ppm) | 3,482.08 | 5286.4 | 39.03 |
| Sodium (ppm) | 14,040.59 | 17500 | 510 |
| Potassium (ppm) | 500 | 700 | 22 |
| Calcium (ppm) | 650 | 1350 | 25 |
| Heavy Metals (ppb) | | | |
| Silicon (Si) | 309.85 | 553.2 | 23 |
| Antimony (Sb) | 15.15 | 1 | 0.7 |
| Barium (Ba) | 5.4 | 9 | 0.3 |
| Strontium (Sr) | 5249 | 7799 | 148 |
| Boron (B) | 30480 | 38060 | 6880 |
| Molybdenum (Mo) | 14050 | 23350 | 1706 |

Figure 16:
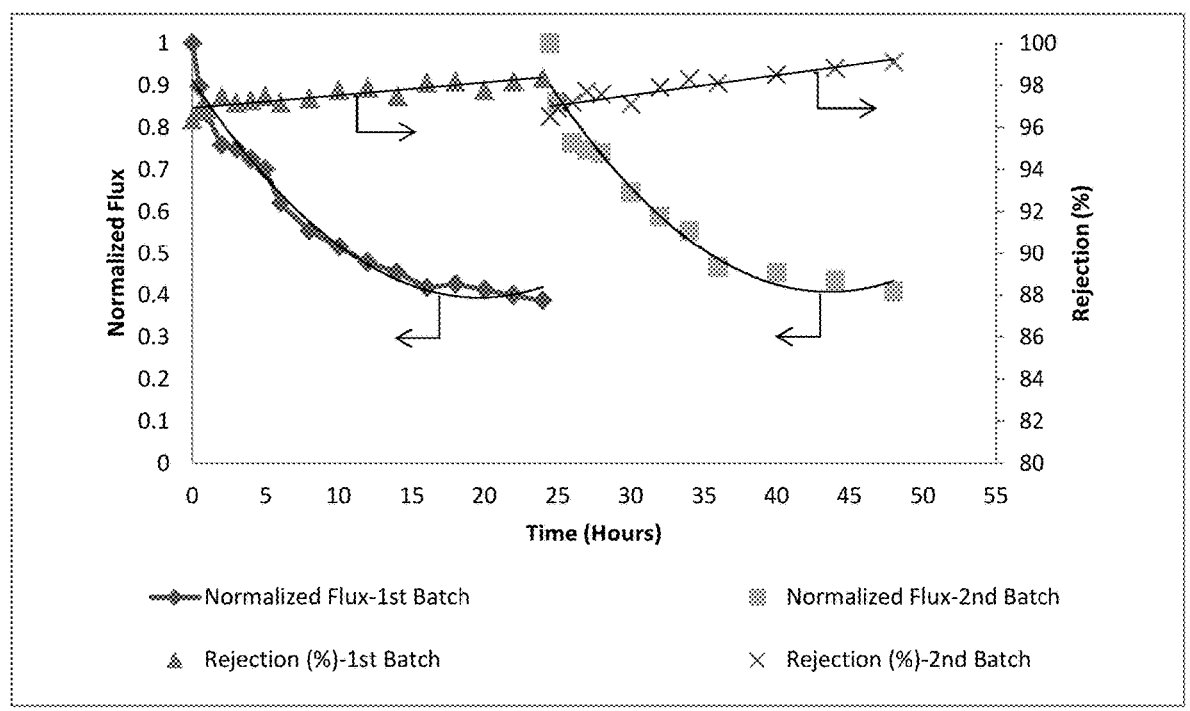
FIG. 16 depicts a graphical representation of normalized flux and salt rejection vs time of PA/AG membrane at 0.2 wt. % AG in the dope solution according to an embodiment of the present disclosure. (TDS of the feed solution: 45,000 ppm, pH 8.36. Operating pressure: 54 bars)

The prepared PA/AG membranes were tested by carrying out a filtration experiment using Qatari seawater without any pre-treatment. The filtration experiment was carried out continuously for 48 h. The initial permeate flux was found to be reasonably high (above 5 LMH) for this high salinity feed solution. The salt rejection was found to slightly increase and reach up to 99.1% with filtration time as shown in FIG. 16. This might be attributed due to some compaction of the membrane porous structure as well as formation of a cake/gel layer from suspended, organic and microbiological matter in seawater on the membrane surface that resulted in a higher salt rejection. FIG. 16 shows the reduction in the normalized permeate flux with time (from 1 at the beginning of the time down to 0.3 after 24 hours). This might be explained by an increase in salt concentration and in turn, in the osmotic pressure of the feed seawater in membrane cell during filtration. The TDS of the brine solution after 24 hours of filtration time has increased by more than 55% (from 45,000 ppm at the beginning of the experiment up to about 70,000 ppm at the end of each batch).

Figure 17:
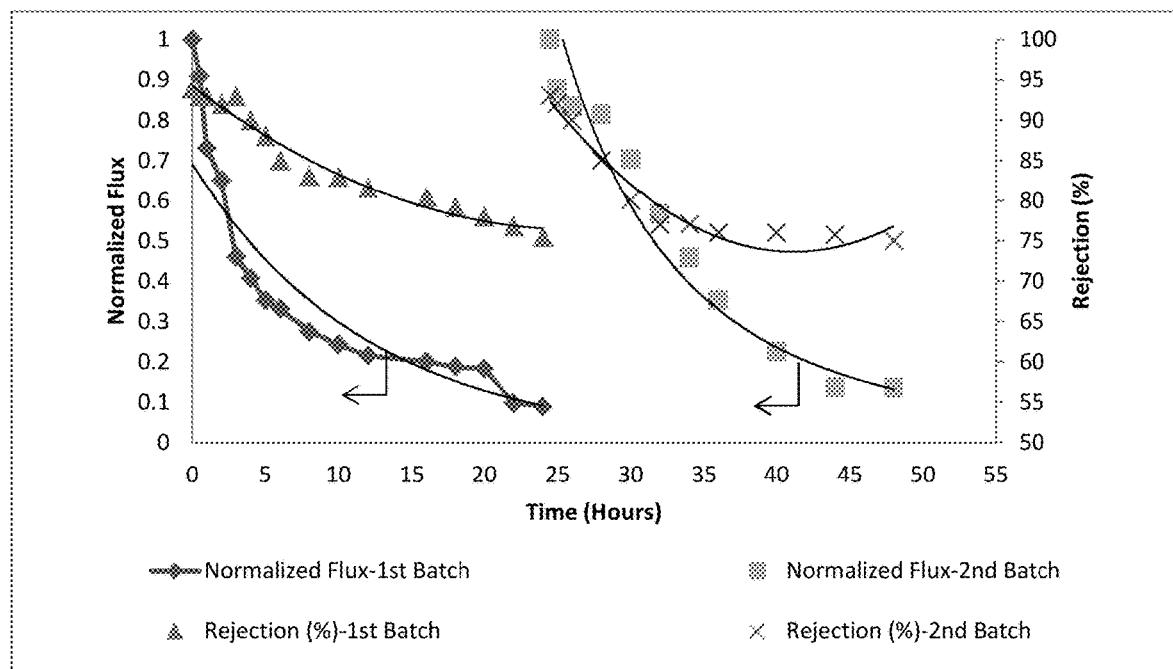
FIG. 17 depicts a graphical representation of flux and salt rejection vs time of the commercial membrane (Osmonics) according to an embodiment of the present disclosure. (TDS of the feed solution: 45,000 ppm, pH 8.36. Operating pressure: 54 bars)
Figure 18:
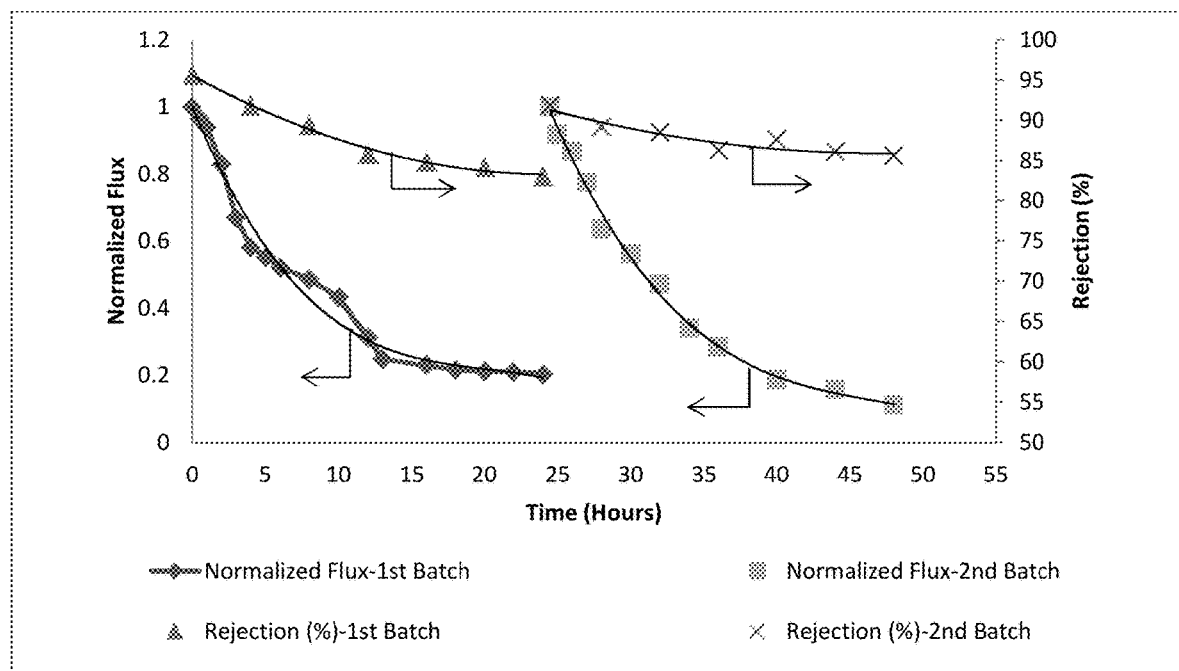
FIG. 18 depicts a graphical representation of flux and salt rejection vs time of the commercial membrane (Dow SW30HR) according to an embodiment of the present disclosure. (TDS of the feed solution: 45,000 ppm, pH 8.36. Operating pressure: 54 bars)

For comparison and at the same conditions seawater filtration experiments were conducted using two commercial TFC membranes (GE Osmonics and Dow SW30HR). As shown in FIGS. 17 and 18, the commercial membranes showed lower overall salt rejection compared to PA/2 wt. % AG membranes. Moreover, as shown in FIGS. 17 and 18, PA/AG membrane demonstrated higher normalized flux values when compared with commercial membranes (GE Osmonics and Dow SW30HR). For example, normalized flux values after 24 and 48 hours filtration time were 0.38 and 0.4 for PA/AG membrane, while 0.09 and 0.13 for Osmonics membrane and 0.2 and 0.11 for Dow membrane. Lower flux decline for PA/AG membrane might be due to the enhancement in the membrane properties such as hydrophilicity, negative surface charge and surface roughness.

According to the embodiment as described above, a TFC PA membranes blended with 0.01-0.2 wt. % of AG have been prepared by Interfacial polymerization. It was found that hydrophilicity of PA/AG membranes increased (by up to 45%) compared with bare PA membrane. This is due to amphiphilic nature of AG when hydrophobic parts of AG macromolecules are adsorbing to the hydrophobic PA polymer network while the hydrophilic residues of AG are protruding towards the aqueous phase. In addition, it was shown that PA/AG membranes reduced surface roughness (by 63%) and increased chlorine resistance (by 52%) compared with bare PA membrane. The presence of carboxylic and amino groups in AG macromolecules has been found to increase the negative surface charge of the membrane surface. The membrane flux was also improved with PA/AG membranes as a result of the enhancement in the membrane hydrophilicity and surface charge while maintaining NaCl rejection above 96%. Due to the increase in hydrophilicity and reduction in the surface roughness, a significant reduction in the fouling of PA/AG membranes was observed by the increase in the normalized flux (by 44%) when sodium alginate solution was filtered through the membrane. The RO PA/AG membranes were tested with seawater collected from the Arabian Gulf and showed higher salt rejection and lower flux decline during filtration when compared to commercial membranes (GE Osmonics and Dow SW30HR). These findings indicate that AG incorporation in PA layer can be used to enhance the properties and performance of TFC PA membranes.

According to another embodiment of the present disclosure, a water filtration system is provided. The water filtration system includes a water filter including a composite reverse osmosis membrane. The composite includes a first layer including a polyamide compound, and a second layer including acacia gum.

According to another embodiment of the present disclosure, acacia gum may be used to provide for an increase pore size of the reverse osmosis membrane. In an embodiment, acacia gum may also be used to increase the total porosity of a reverse osmosis membrane. In an embodiment, acacia gum may increase the flux of a casted reverse osmosis membrane. In an embodiment, acacia gum may increase hydrophilicity of a casted reverse osmosis membrane. In an embodiment, acacia gum may increase the surface charge of a reverse osmosis membrane. In an embodiment, the use of acacia gum may reduce the surface roughness of a reverse osmosis membrane. In an embodiment the use of acacia gum may reduce or eliminate fouling of a reverse osmosis membrane. In an embodiment, the reverse osmosis membrane may be used in water desalination. In an embodiment, the reverse osmosis membrane may be used in water treatment. In an embodiment, the reverse osmosis membrane may be used in water purification. In an embodiment, the reverse osmosis membrane may be used in gas purification.

It should be understood that various changes and modifications to the present embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A reverse osmosis membrane, comprising:
a layer including a polyamide compound and acacia gum.

2. The reverse osmosis membrane according to claim 1, wherein the polyamide compound is derived from polymerization of m-phenylenediamine and trimesoyl chloride.

3. The reverse osmosis membrane according to claim 1, wherein a concentration of the acacia gum is from 0.01 wt. % to 0.2 wt. %.

4. The reverse osmosis membrane according to claim 1, wherein the acacia gum includes high molecular weight polysaccharides.

5. The reverse osmosis membrane according to claim 1, wherein a total porosity of the reverse osmosis membrane is more than 35% when a concentration of the acacia gum is 0.07 wt. %.

6. The reverse osmosis membrane according to claim 1, wherein a water contact angle of the reverse osmosis membrane is lower than 40 degrees when a concentration of the acacia gum is 0.07 wt. %.

7. The reverse osmosis membrane according to claim 1, wherein a pure water permeability of the reverse osmosis membrane is more than 1.2 LMH/bar when a concentration of the acacia gum is 0.07 wt. %.

8. The reverse osmosis membrane according to claim 1, wherein a salt rejection of 2000 ppm sodium chloride solution of the reverse osmosis membrane is more than 90% when a concentration of the acacia gum is 0.07 wt. %.

9. A water filtration system, comprising:
a water filter including a reverse osmosis membrane,
wherein the reverse osmosis membrane includes a layer including a polyamide compound and a second layer including acacia gum.

10. The water filtration system according to claim 9, wherein the polyamide compound is derived from polymerization of m-phenylenediamine and trimesoyl chloride.

11. The water filtration system according to claim 9, wherein a concentration of the acacia gum is from 0.01 wt. % to 0.2 wt. %.

12. The water filtration system according to claim 9, wherein the acacia gum includes high molecular weight polysaccharides.

13. The water filtration system according to claim 9, wherein a total porosity of the reverse osmosis membrane is more than 35% when a concentration of the acacia gum is 0.07 wt. %.

14. The water filtration system according to claim 9, wherein a water contact angle of the reverse osmosis membrane is lower than 40 degrees when a concentration of the acacia gum is 0.07 wt. %.

15. The water filtration system according to claim 9, wherein a pure water permeability of the reverse osmosis membrane is more than 1.2 LMH/bar when a concentration of the acacia gum is 0.07 wt. %.

16. The water filtration system according to claim 9, wherein a salt rejection of 2000 ppm sodium chloride solution of the reverse osmosis membrane is more than 99% when a concentration of the acacia gum is 0.07 wt. %.

* * * * *